3 Sheets--Sheet 1.

O. B. KENDALL.
Low-Water Indicator for Steam-Boilers.

No. 159,184. Patented Jan. 26, 1875.

WITNESSES
Henry N. Miller
C. L. Enoch

INVENTOR
O. B. Kendall
per
Alexander T. Mason
Attorneys

3 Sheets--Sheet.2.

O. B. KENDALL.
Low-Water Indicator for Steam-Boilers.

No. 159,184. Patented Jan. 26, 1875.

WITNESSES

INVENTOR
O. B. Kendall,
per
Alexander Mason
Attorneys

3 Sheets--Sheet 3.

O. B. KENDALL.
Low-Water Indicator for Steam-Boilers.

No. 159,184.

Patented Jan. 26, 1875.

WITNESSES
Henry N. Miller
C. L. Evert

INVENTOR
O. B. Kendall,
per
Alexander Mator
Attorneys

UNITED STATES PATENT OFFICE.

ORSON B. KENDALL, OF BUFFALO, NEW YORK.

IMPROVEMENT IN LOW-WATER INDICATORS FOR STEAM-BOILERS.

Specification forming part of Letters Patent No. 159,184, dated January 26, 1875; application filed December 16, 1874.

*To all whom it may concern:*

Be it known that I, ORSON B. KENDALL, of Buffalo, in the county of Erie and in the State of New York, have invented certain new and useful Improvements in Water - Regulators and Low-Water Alarm for Steam - Boilers; and do hereby declare that the following is a full, clear, and exact description thereof, reference being had to the accompanying drawings and to the letters of reference marked thereon, making a part of this specification.

My present invention is intended as an improvement upon the Letters Patent for water-regulators for steam-boilers granted to me September 22, 1874; and it consists in combining with the water-regulator therein shown a whistle, to form a low-water alarm.

In order to enable others skilled in the art to which my invention appertains to make and use the same, I will now proceed to describe its construction and operation, referring to the annexed drawings, in which—

Figure 1:
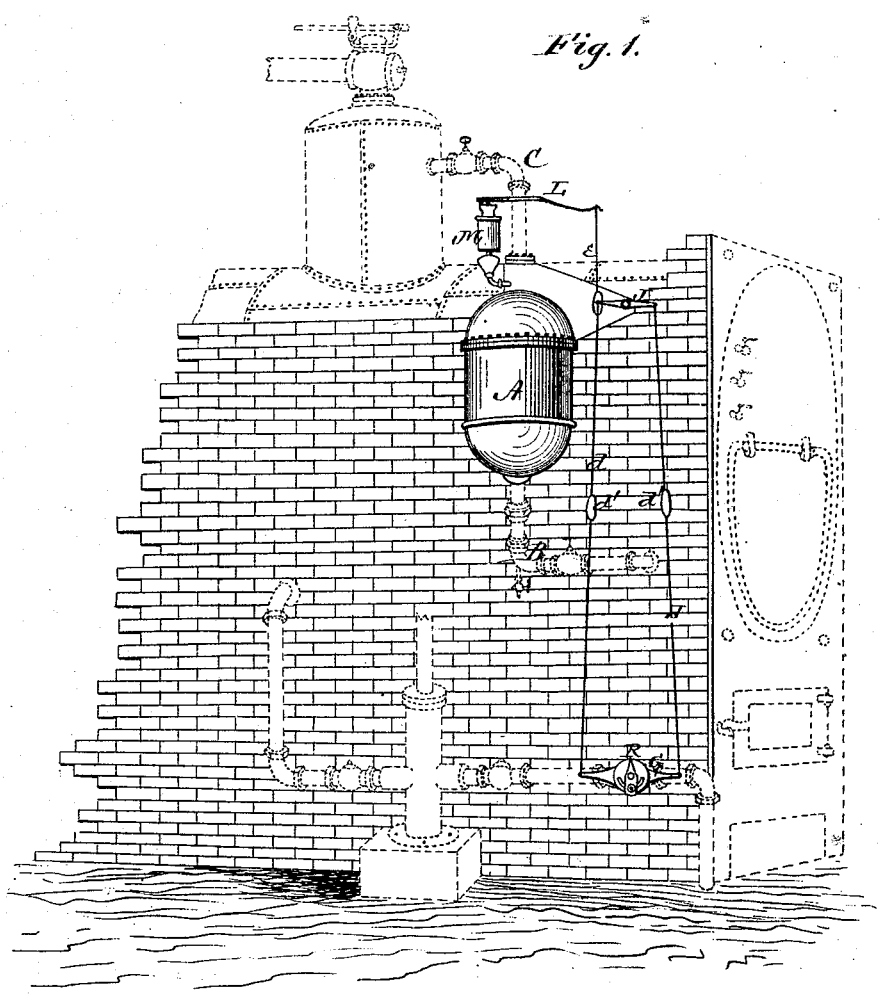
Figure 2:
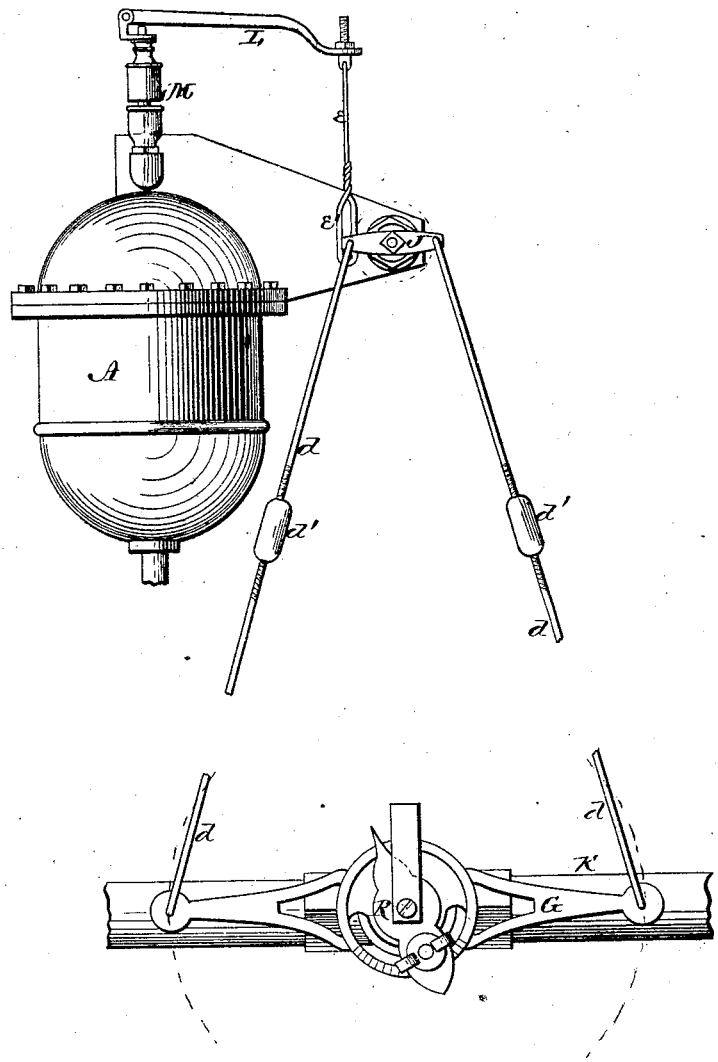
Figure 3:
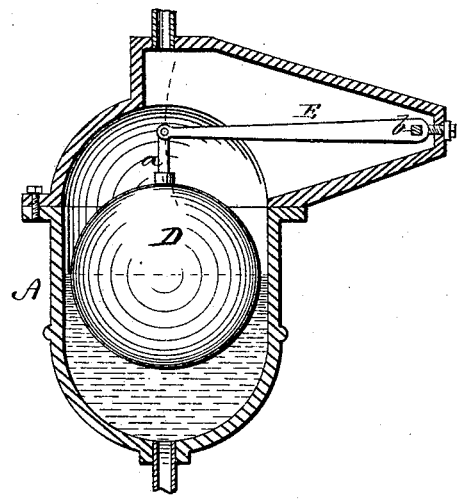
Figure 4:
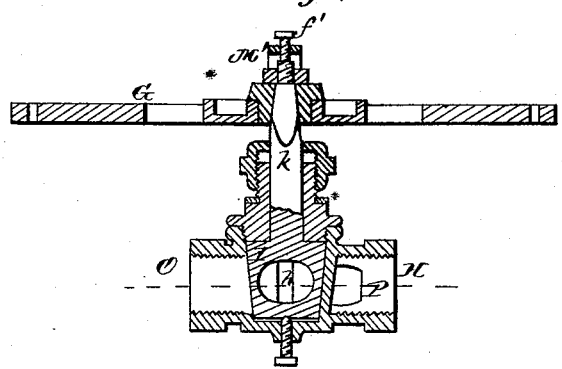
Figure 5:
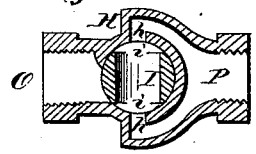

Figure 1 is a perspective view, showing my water-regulator and low-water alarm applied to a horizontal steam-boiler. Fig. 2 is an enlarged view of the water-regulator, alarm, and valve. Fig. 3 is a vertical section of the cylinder with interior float. Figs. 4 and 5 are sections of the valve.

A represents the cylinder, which is attached to the boiler in a manner and at a height which brings its center just to and parallel with the true water-level or water-line. At the top the steam-pipe C, and at the bottom the water-pipe B, connect the interior of the cylinder with the interior of the boiler, to supply it with both water and steam, allowing the water-level inside the cylinder A to exactly correspond with that in the boiler. Inside of the cylinder A is a float, D, made of extra heavy plate, and its strength tested before being placed in position, to be more than doubly equal to any pressure it will be subjected to while in use. This float is balanced, or submerged in the water just to its center, so that its weight and buoying capacity are equal. The float is connected, by a rod or link, $a$, with one end of an arm or lever, E, which passes through the steam-chest, and is, at its other end, firmly secured on a shaft, $b$, passing horizontally through the outer end of the steam-chest. On one end of the shaft $b$ is secured a lever, J, the ends of which are connected, by rods $d\ d$, with the ends of a lever, G, secured upon the stem of a valve, H I, in the water-pipe K. The rods $d\ d$ are each made in two parts, and connected by screw-connections $d'\ d'$, having right and left threads, so that the rods can be lengthened or shortened, as desired.

When the float is down the valve H I is open, allowing the feed-water to pass through the pipe K into the boiler, and as the water rises in the boiler it rises also in the cylinder, carrying the float with it. The float, as it rises, elevates the arm E, turning the shaft $b$ in its bearings, thus also turning the lever J, and, by means of the rods $d\ d$, closing the valve H I. In like manner, when the float falls, the valve will be opened again. When the float gets to low-water mark and opens the valve the lever J, by an adjustable rod, $e$, operates the whistle-lever L to open the valve in the whistle M, and thus sound the alarm for low water, the whistle being connected with the steam-space of the cylinder A. The lower end of the rod $e$ has an elongated slot, $e'$, in which a pin on the lever J works, so that the whistle will not be sounded until the water gets down to the low-water mark.

The barrel H of the valve is, on one side, provided with the inlet O, and on the opposite side is formed an outlet-chamber, P, connected with the interior of the barrel by means of two openings or ports, $h\ h$, directly opposite each other. The plug I has two ports, $i\ i$, opposite each other, and may be turned so as to close the ports $h\ h$ entirely, or let more or less water pass through, as required. The valve-plug I is made tapering, and the interior of the valve-chamber H made to correspond, the lower or inner end of the valve resting on an adjusting-screw, $f$, and held against the same by means of an adjusting-screw, $f'$, which passes through a spring-arm, M', and bears against the end of the valve-stem $k$, said spring-arm being attached to the stuffing-box attached to the valve-barrel, and through which the valve-stem passes. On the end of the stem $k$ the lever G is placed, and provided with the pointer R in the same manner as described in my former patent above referred to.

By setting the pointer R in different positions the water-line of the boiler may be changed, as desired, to carry more or less water. Thus the height of the water in the boiler may be safely and accurately changed to meet each and every demand.

Having thus fully described my invention, what I claim as new, and desire to secure by Letters Patent, is—

In combination with the cylinder A, float D, rod $a$, levers E and J, rods $d\ d$, and lever G, the whistle M, lever L, and rod $e$, having loop $e'$, all substantially as set forth.

In testimony that I claim the foregoing I have hereunto set my hand and seal this 1st day of December, 1874.

ORSON B. KENDALL. [L. S.]

Witnesses:
E. C. PATTISON,
C. E. KENDALL.